United States Patent [19]

Mohino

[11] Patent Number: 5,783,761
[45] Date of Patent: Jul. 21, 1998

[54] METHOD AND APPARATUS FOR PROPELLER RUNNER INSPECTION

[75] Inventor: Alfred Mohino, Puslinch, Canada

[73] Assignee: Ontario Hydro, Toronto, Canada

[21] Appl. No.: 867,067

[22] Filed: Jun. 2, 1997

[51] Int. Cl.[6] .................................................... B08B 9/00
[52] U.S. Cl. ......................................................... 73/865.8
[58] Field of Search .................................. 73/865.8, 147, 73/149; 415/118

[56] References Cited

U.S. PATENT DOCUMENTS 5,503,033  4/1996  Van Niekerk.

Primary Examiner—Robert Raevis
Attorney, Agent, or Firm—Lieberman & Brandsdorfer, LLC

[57] ABSTRACT

The present application discloses a method of facilitating the inspection of hydroelectric runner blades mounted within a water passage comprising the step lowering a portable inspection platform down into the water passage to a position adjacent to and below the blades of the runner. The platform is configured to hold at least one person and to pass between the blades of the runner. The present application also discloses an inspection platform system for supporting an inspector adjacent the blades of a runner mounted within a water channel in a hydroelectric facility comprising a portable inspection platform dimensioned and configured to support the inspector and pass between the blades of the runner. The portable inspection platform system also comprises a cable for lowering the inspection platform into the desired position, the cable dimensioned and configured to safely support the platform and pass between the runner blade and the water channel.

9 Claims, 3 Drawing Sheets

METHOD AND APPARATUS FOR PROPELLER RUNNER INSPECTION

FIELD OF THE INVENTION

The present invention relates to methods of inspecting the blades of hydroelectric propeller type inspectors.

BACKGROUND OF THE INVENTION

A significant fraction of the worlds electric power is generated by Hydro electric generating stations. In hydro electric generation, water is stored in large reservoirs, lakes or rivers. The stored water is channeled via large penstocks into hydro electric generating stations. Large generating stations usually have a water turbine (also called a propeller runner), a water passage and an electric generator coupled to the runner. The runner is usually suspended in a metallic tube or throat ring that forms part of a vertical water passage. The water passes from the reservoir to the vertical water passage, past the runner and finally to an outlet. As the water passes the runner, it gives up some of its kinetic energy to the runner. The rotating runner in turn drives the electrical generator.

The blades of propeller runners are specifically designed to extract as much kinetic energy from the moving water as possible. In particular, the runner blades are dimensioned such that the tips of the blades are at most 6 mm from the throat ring. The extreme pressure variations created by the flowing water may result in the pitting of the runner blades by a phenomenon called cavitation. These cavities occasionally collapse near the blades surface. This wear on the blades decreases the runners efficiency and may even make the runner impossible to operate safely. Also, over time, small faults may develop in the runner blades which, if left unattended to, may result in the failure of the blades. The tips of the runner blades, traveling faster and being in closer proximity with the throat ring, are particularly susceptible to wear. Therefore, periodic inspection of the blades, especially on its underside and at the tips, is critical to proper maintenance.

To date, the only method available for inspecting hydro electric runner blades was to close off the water passage above the runner, drain the water in the vertical passage, and build a scaffolding beneath the runner. The scaffolding has to be sufficiently wide to permit inspection of the entire undersurface of the runner blades. Building of a scaffolding within the vertical water channel and below the runner is a time consuming and laborious task. Depending on the size of the runner, it can take between three to fourteen days to construct the scaffolding and inspect the blades after the vertical water passage has been drained. After the scaffolding is constructed, the actual inspection process can usually be conducted in about one day. Since the costs, in terms of lost generating revenue, associated with the runner sitting idle while the scaffolding is constructed can be very high, there is a need for a quicker method of runner blade inspection.

SUMMARY OF THE INVENTION

The present invention is a method of facilitating the inspection of hydroelectric runner blades mounted within a water passage comprising the step lowering a portable inspection platform down into the water passage to a position adjacent to and below the blades of the runner. The platform is configured to hold at least one person and to pass between the blades of the runner.

The present invention is also directed at a method of facilitating the inspection of runner blades as defined above wherein the platform is lowered by means of a cable, the cable dimensioned to pass between the tip of a runner blade and the walls of the water passage.

The method of facilitating runner blade inspection may also include the step of rotating the runner after a blade is inspected to bring another blade in proximity to the platform for inspection. The cable may be made of a material having high tensile strength.

The present invention is also directed at an inspection platform system for supporting an inspector adjacent the blades of a runner mounted within a water channel in a hydroelectric facility comprising a portable inspection platform dimensioned and configured to support the inspector and pass between the blades of the runner. The portable inspection platform system also comprises a cable for lowering the inspection platform into the desired position, the cable dimensioned and configured to safely support the platform and pass between the runner blade and the water channel.

BRIEF DESCRIPTION OF THE FIGURES

Further features and advantages of the method and device embodying the present invention will now be described and made clearer from the ensuing description, reference being had to the accompanying drawings, in which.

DETAILED DESCRIPTION OF THE INVENTION

Figure 1:
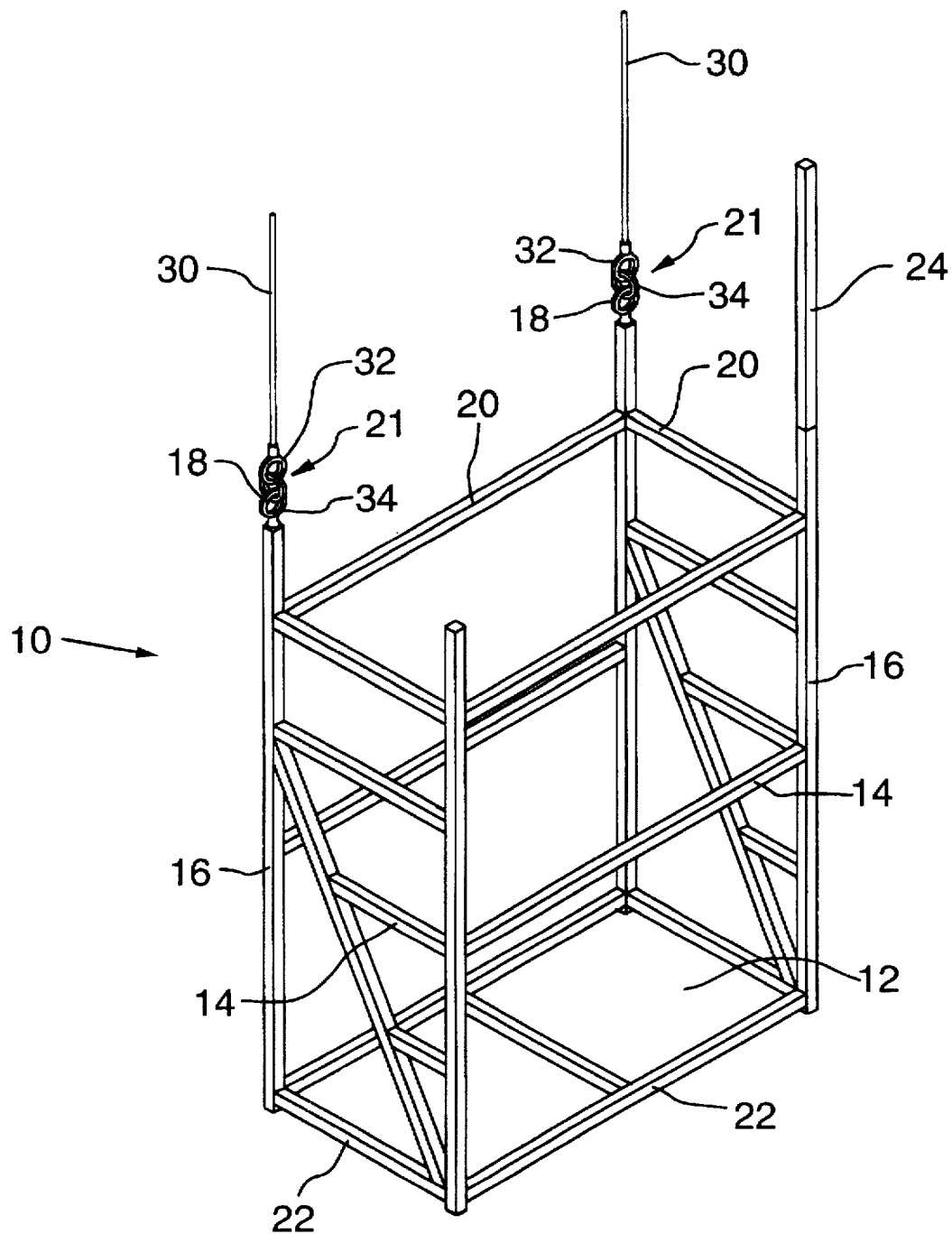
FIG. 1 is a perspective view of the portable inspection platform of the present invention.

Referring firstly to FIG. 1, the portable inspection platform of the present invention, shown generally as item 10, comprises floor 12, side rails 14, vertical braces 16, attachment members 18, top members 20, lower members 22, and handle 24. Attachment members 18 are preferably welded onto vertical braces 16. Top members 20, lower members 22, side rails 14 and vertical braces 16 are all preferably made of aluminum angular or tubular members welded together, while floor 12 can simply comprise a flat sheet of reinforced aluminum or even plywood. Alternatively, the component parts of members 20 and 22, rails 14 and braces 16 can be made of aluminum angular members or tubes assembled by bolts. Platform 10 is dimensioned such that at least one inspector can stand comfortably within the platform with sufficient room to turn and move about. For most inspection and maintenance applications, the platform should be sufficiently large to hold two inspectors.

The platform is releasably attachable to cables 30 by attachment means 21, which preferably comprise attachment members 18, split rings 34 and cable rings 32. Attachment members 18 are preferably made of high tensile strength steel and are selected to be sufficiently strong to hold up platform 10 and at least one inspector. Cable rings 32 are also made of high tensile strength steel and are securely and permanently attached to the ends of cables 30. Split rings 34 are preferably made of high tensile strength steel and are each provided with movable section that allows the split ring to be opened or closed to permit cable 30 to be attached and detached to platform 10.

Figure 2:
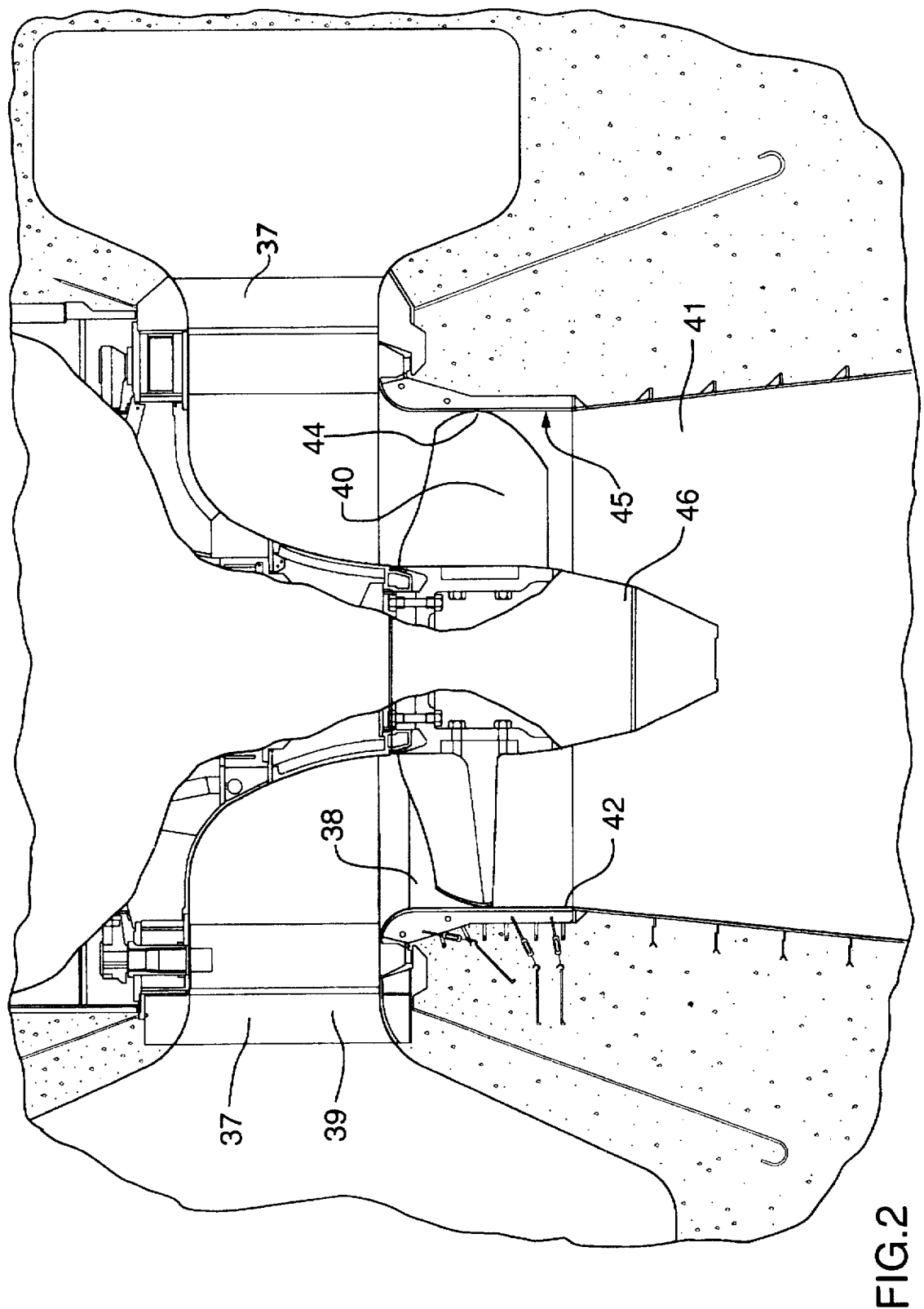
FIG. 2 is a side view of a hydro electric runner contained in a water vertical water passage.

Referring now to FIG. 2. runner 46 is positioned within throat 42 of vertical water passage 38. Blades 40 are positioned around runner 46. Tips 44 of blades 46 are separated from the inside surface 45 of throat 42 by only a few millimeters. Water enters vertical passage 38 via opening 37. and exits throat 42 via draft tube 41. The electric generator (not shown) is positioned above runner 46.

Cable 30 preferably comprises a flat wide ribbon made of a high tensile strength material such as steel. The thickness of the cable is preferably no greater than 1/8 th of an inch. The distance between tip 44 of runner blade 40 and inside surface 46 of throat 42 is usually about 6 mm. therefore. cable 30 can pass between blade 40 and throat 42 if needed. This is a useful feature as it allows blade 40 to be rotated slowly over platform 10 without contacting cables 30.

Figure 3:
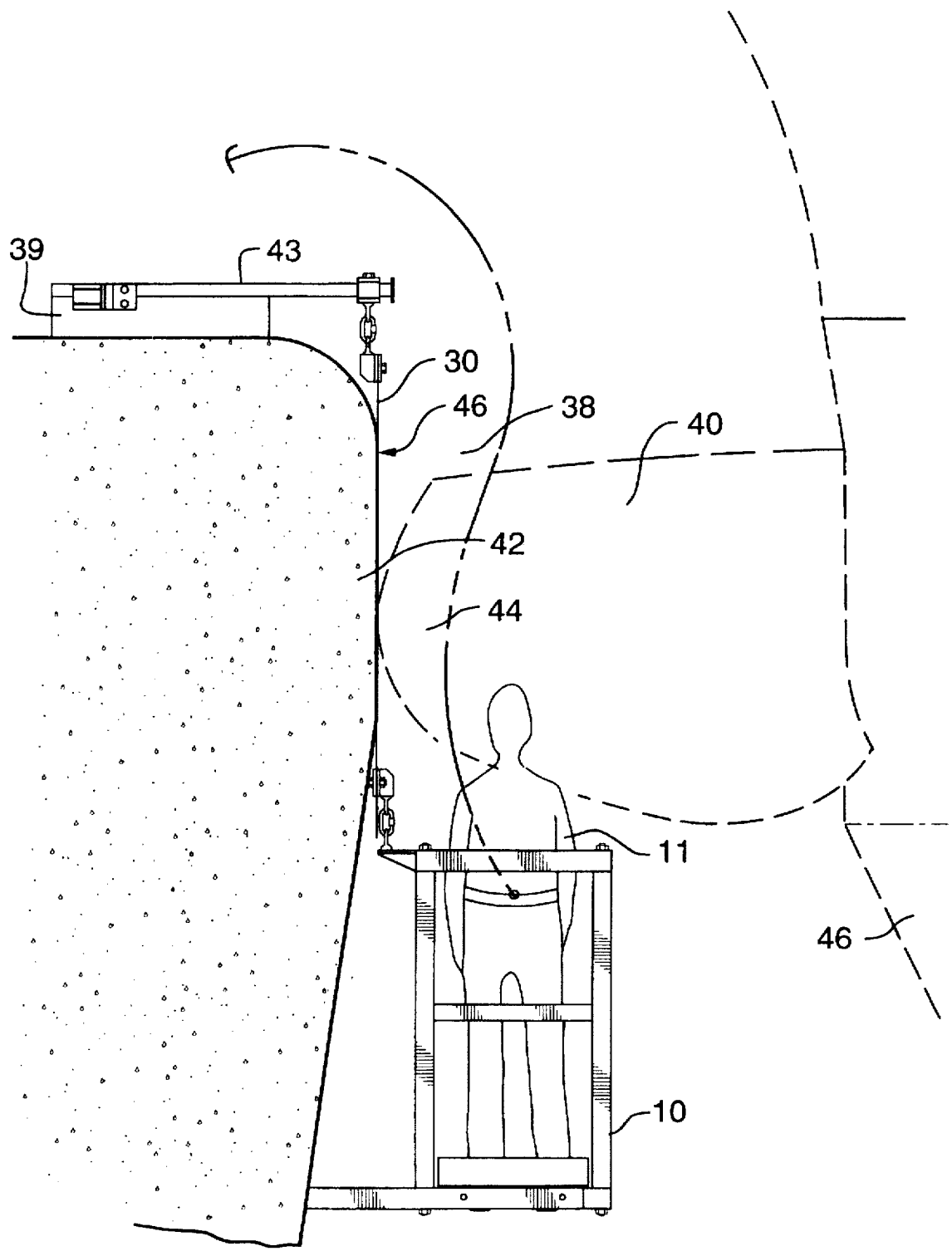
FIG. 3 is a side view of a hydro electric runner contained in a vertical water passage with the portable inspection platform of the present invention lowered to a position below the runner.

The method of the present invention will now be explained having reference to FIGS. 2 and 3. Firstly. portable platform 10 is lowered via cables 30 into water passage 38 to a position below runner blade 40 and adjacent throat 42. After platform 10 is in position. inspector 11 can be lowered into the platform by a cable or rope. When inside the platform. the inspector may commence the inspection of the underside of the runner blades. Blades 40 can be inspected one at a time by carefully and slowly rotating runner 46 until the next blade is positioned for inspection. Preferably. either a motorized or hand operated winch (not shown) is attached to cable 30 to control the lowering of platform 10. The platform must be positioned relative to runner 46 such that it will pass between blades 40. Care must be taken during the lowering operation to ensure that cables 30 do not contact runner blades 40 and cause damage to the blade or wear to the cables. To aid the lowering of platform 10. cable 30 may be lowered from boom 43 anchored to a vane 39 located inside opening 37. Alternatively. cable 30 may be anchored to vane 39 without the aid of a boom.

The inspector inside platform 10 can inspect the underside of runner blades 40 one at a time. After the first runner blade 40 is inspected. runner assembly 46 can be slowly rotated to bring another runner blade into position by passing the runner blade over cables 30. All of the runner blades can be inspected in this way. Since platform 10 is positioned adjacent throat 42. tips 44 of runner blades 40 can be inspected carefully.

In several situations. it is preferable to mount platform 10 directly to throat 42 after it has been lowered into position. To do so. the inspector first drills holes into the wall while platform 10 is in position. The inspector then secures expandable bolts (not shown) into the holes and attaches platform 10 to the bolts. The bolts may then be attached to attachment members 18 via split rings. After platform 10 is attached to the wall. cables 30 may be detached from the platform and raised. With the platform free of the cables. runner blades 40 can be rotated into a suitable position for inspection without the fear that they will contact the cables.

After the inspection is completed. the cables can be reattached to platform 10. the expanding bolts detached from attachment members 18 and the platform raised out of water passage 38.

The invention having been so described, certain modifications and adaptations will be obvious to those skilled in the art. The invention includes all such modifications and adaptations which follow in the scope of the appended claims.

Therefore what is claimed is:

1. A method of facilitating the inspection of the blades of a runner mounted within a water passage of a hydroelectric facility comprising the step of lowering a portable inspection platform to a position adjacent to and below the blades of the runner. the platform dimensioned and configured to support an inspector. the platform further dimensioned and configured to pass between the blades of the runner.

2. A method of facilitating the inspection the blades of a runner as defined in claim 1 wherein the water passage has walls and wherein a lowering means comprises a cable dimensioned to pass between the tip of a runner blade and the walls of the water passageway.

3. A method of facilitating the inspection of the blades of a runner as defined in claim 2 further comprising the step of rotating the runner after a blade is inspected to bring another blade in proximity to the inspection platform for inspection.

4. A method of facilitating the inspection of the blades of a runner as defined in claim 2 wherein the cable comprises a flat ribbon made of a high tensile strength material.

5. A method of facilitating the inspection of the blades of a runner as defined in claim 2 wherein cables are detacheably attached to the portable platform by an attachment means and further comprising the step of releasably mounting the platform to the walls of the water channel after the platform has been lowered into position.

6. A method of facilitating the inspection of the blades of a runner as defined in claim 5 wherein the platform is releasably mounted to the walls of the platform.

7. An inspection platform system for supporting an inspector adjacent the blades of a runner mounted within a water channel in a hydroelectric facility comprising:

(a) a portable inspection platform dimensioned and configured to support the inspector and pass between the blades of the runner;

(b) a cable for lowering inspection platform into the desired position. and (c) the cable dimensioned and configured to safely support the platform and pass between the runner blade and the water channel.

8. An inspection platform system as defined in claim 7 further comprising means for releasably attaching the cable to the inspection platform.

9. An inspection platform system as defined in claim 8 further comprising means for releasably attaching the inspection platform to the walls of the water channel.

* * * * *